United States Patent [19]

Rafuse, Jr. et al.

[11] Patent Number: 5,797,729

[45] Date of Patent: Aug. 25, 1998

[54] CONTROLLING MULTIPLE VARIABLE SPEED COMPRESSORS

[75] Inventors: Lenley J. Rafuse, Jr., Franklin; Hamed S. Borhanian, Allston, both of Mass.; Willard C. Pope, York, Pa.

[73] Assignee: Aspen Systems, Inc., Marborough, Mass.

[21] Appl. No.: 602,584

[22] Filed: Feb. 16, 1996

[51] Int. Cl.[6] .................................................. F04B 41/06
[52] U.S. Cl. ............................ 417/3; 417/53; 62/126
[58] Field of Search ............................ 417/3, 4, 5, 6, 417/7, 8, 17, 18, 19, 20, 22, 42, 45, 44.2, 53; 415/1, 17; 62/126, 196.2, 196.4, 222, 228.4, 228.3

[56] References Cited

U.S. PATENT DOCUMENTS

| | | |
|---|---|---|
| 2,231,069 | 2/1941 | Harris . |
| 4,951,475 | 8/1990 | Alsenz . |
| 5,067,326 | 11/1991 | Alsenz . |
| 5,230,223 | 7/1993 | Hullar et al. ................ 62/196.4 |
| 5,265,434 | 11/1993 | Alsenz . |
| 5,396,779 | 3/1995 | Voss ............................ 62/196.2 |
| 5,522,707 | 6/1996 | Potter ............................... 417/4 |
| 5,586,444 | 12/1996 | Fung ............................... 417/5 |

OTHER PUBLICATIONS

"The new refrigeration system technology" brochure from Margaux CVC; Date: unk.

*Primary Examiner*—Ayaz R. Sheikh
*Assistant Examiner*—Xuan M. Thai
*Attorney, Agent, or Firm*—Fish & Richardson P.C.

[57] ABSTRACT

A refrigeration system having a plurality of variable speed compressors, each variable speed compressor operating at a speed substantially the same as the other energized variable speed compressors, the speed being below a maximum speed of the compressors.

13 Claims, 12 Drawing Sheets

| SDT °F | # OF COMPRESSORS ON | | |
|---|---|---|---|
| | 1 | 2 | 3 |
| 110 | 0-16.4% | 16.4-28.9% | 28.9-100% |
| 90 | 0-17.4% | 17.4-30.2% | 30.2-100% |
| 69 | 0-16.3% | 16.3-29.3% | 29.3-100% |

CONTROLLING MULTIPLE VARIABLE SPEED COMPRESSORS

BACKGROUND

This invention relates to controlling multiple variable speed compressors.

Figure 1:
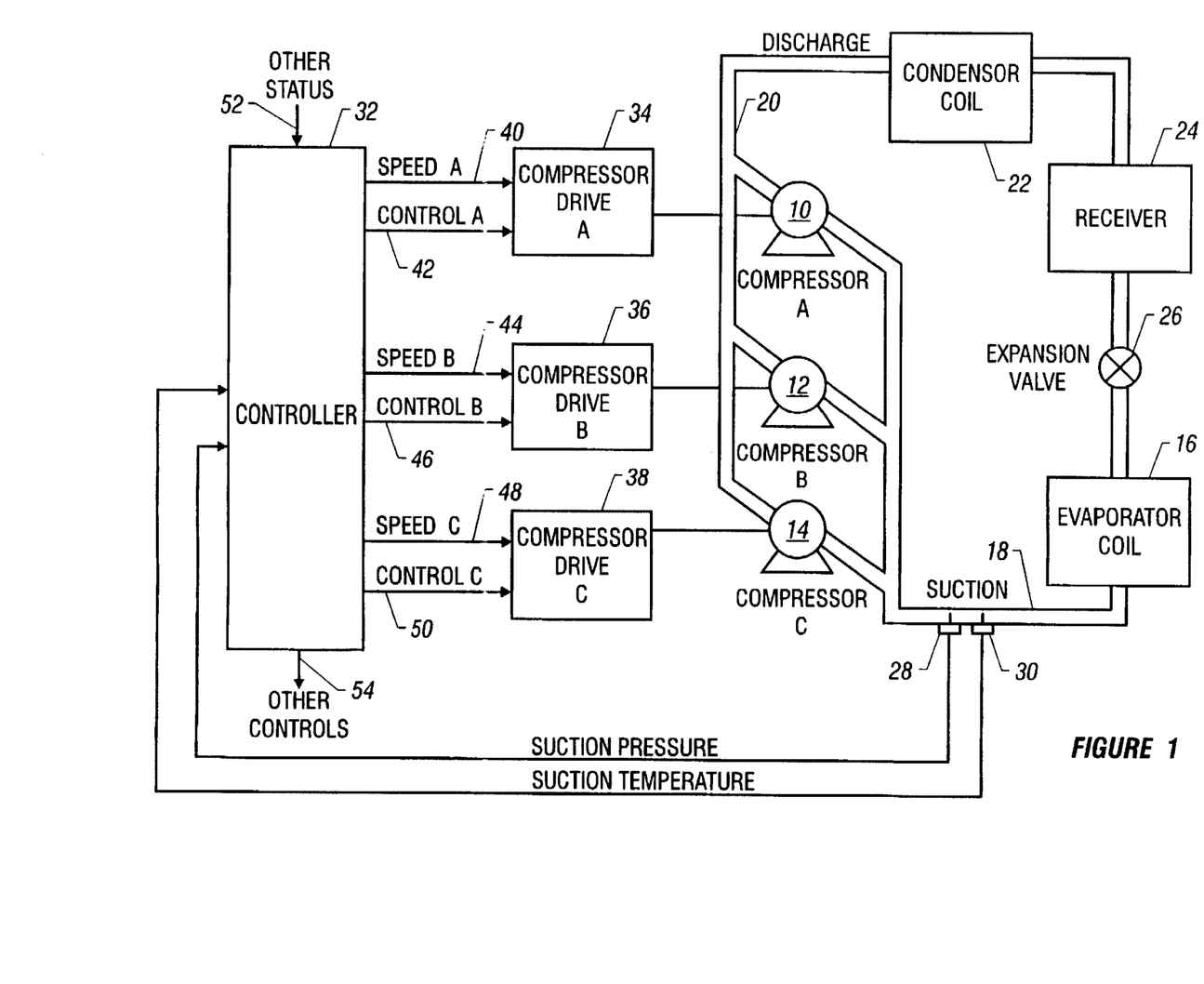
FIGS. 1, 6 and 8 are block diagrams of refrigeration systems.

In an existing refrigeration system, as shown in FIG. 1, variable speed compressors A, B and C (10, 12, 14, respectively) receive refrigerant from an evaporator coil 16 via a suction line 18. The compressors compress the refrigerant and discharge it through a discharge line 20 into a condenser coil 22. In the condenser coil, the refrigerant cools and condenses into a liquid which is accumulated in a receiver 24. The refrigerant flows out of the receiver to an expansion valve 26. The expansion valve creates a pressure differential between the receiver and the evaporator coil, causing the refrigerant to expand into a gas in the evaporator coil. Consequently, the evaporator coil removes heat from the environment and cools a refrigerated area around it.

Existing refrigeration systems monitor the temperature and the pressure in the suction line manifold using a suction pressure sensor 28 and a suction temperature sensor 30. The two sensors are connected to a controller 32.

Suction pressure and suction temperature are roughly proportional to the temperature of the refrigerated area. Therefore, by controlling suction pressure or suction temperature, the controller can control the temperature of the refrigerated area and monitor how well the refrigeration system is maintaining it at a desired temperature. If the suction pressure or suction temperature indicate that the temperature in the refrigerated area is too high [low], the amount of compressor capacity being applied to the refrigerant is too low [high], and the controller must increase [decrease] compressor capacity.

The controller accomplishes the required change in compressor capacity through signals to a compressor drive A, 34, a compressor drive B, 36, and a compressor drive C, 38. The controller is connected to compressor drive A by two signals, speed A, 40, and control A, 42, to compressor drive B by two signals, speed B, 44 and control B, 46, and to compressor drive C by two signals, speed C, 48 and control C, 50. The controller can vary the speed of compressor A by changing speed A and can turn off compressor A using control A. Similar functions are provided by the speed B, control B, speed C and control C signals with respect to compressor B and compressor C, respectively.

Existing refrigeration systems control variable speed compressors so that, for example, as the demands on the system increase, the speed of compressor A is increased from a minimum speed to its maximum speed. Only when compressor A reaches its maximum speed is compressor B energized. Compressor B's speed is then increased from its minimum to its maximum as the system load increases. Only when compressor B reaches maximum speed is compressor C energized. Compressor C's speed is then increased from a minimum to a maximum as the system load increases.

The controller also receives other status signals 52 from other parts of the system and exerts other controls 54 over other parts of the system.

SUMMARY

In general, in one aspect, the invention features a refrigeration system having a plurality of variable speed compressors, each variable speed compressor operating at a speed substantially the same as the other energized variable speed compressors, the speed being below a maximum speed of the compressors.

Implementations of the invention may include one or more of the following. The plurality of variable speed compressors may share a common discharge line and a common suction line. The refrigeration system may further comprising a plurality of fixed capacity compressors sharing the common discharge line and the common suction line.

In general, in another aspect, the invention features a method for controlling combinations of a plurality of variable speed compressors sharing a common discharge line and a common suction line, each variable speed compressor operating at a speed substantially the same as the other energized variable speed compressors, comprising the steps of determining a required compressor capacity for a refrigeration load, and energizing a combination of variable speed compressors that provides the required compressor capacity with a higher energy efficiency ratio than other combinations of compressors.

Implementations of the invention may include one or more of the following. The method may further comprise the step of determining the speed at which the chosen combination of compressors provides the required compressor capacity.

In general, in another aspect, the invention features in a refrigeration system with a plurality of variable speed compressors sharing a common discharge line and a common suction line, each compressor operating at a speed substantially the same as the other energized compressors, a first combination of compressors capable of providing a first range of percentage of a maximum capacity provided by the plurality of compressors, and a second combination of compressors capable of providing a second range of percentage of the maximum capacity provided by the plurality of compressors, a method for determining a range of compressor speeds at which the first combination of compressors is more energy efficient than the second combination of compressors, comprising the steps of measuring a first energy efficiency ratio of the first combination of compressors over the first range of percentage of the maximum capacity, measuring a second energy efficiency ratio of the second combination of compressors over the second range of percentage of the maximum capacity, and determining a range of percentages of the maximum capacity over which the first energy efficiency ratio is greater than the second energy efficiency ratio.

In general, in another aspect, the invention features in a refrigeration system having a plurality of variable speed compressors, each variable speed compressor operating at a speed substantially the same as the other compressors, each variable speed compressor having a maximum capacity, a method for controlling the compressors, comprising the steps of determining a total capacity equal to the sum of the maximum capacities of the energized variable speed compressors, determining a required capacity required to meet a refrigeration load, calculating a required compressor speed equal to a scaled ratio of the required capacity to the total capacity, and causing the plurality of compressors to operate at a speed substantially identical to the required speed.

In general, in another aspect, the invention features a refrigeration system controller capable of controlling a plurality of variable speed compressors so that each compressor operates at a speed substantially the same as the other energized variable speed compressors.

In general, in another aspect, the invention features a refrigeration system controller for controlling a plurality of variable speed compressors by choosing a combination of compressors and speeds which maximizes energy efficiency ratio.

In general, in another aspect, the invention features a refrigeration system controller, comprising a single speed control output signal for controlling the speed of a plurality of variable speed compressors.

Implementations of the invention may include one or more of the following. The refrigeration system controller may further comprise a plurality of energize signals, each energize signal causing one of the plurality of variable speed compressors to activate.

In general, in another aspect, the invention features a method for controlling a plurality of variable speed compressors sharing a common discharge line and a common suction line, a first combination of the plurality variable speed compressors operating at a same speed, comprising the steps of determining a required compressor capacity, if the required compressor capacity is above an upper threshold, energizing a second combination of the plurality of variable speed compressors having a greater energy efficiency ratio than the first combination at the required compressor capacity and reducing the speed of the second combination of energized compressors to provide the required compressor capacity, and if the required compressor capacity is below a lower threshold, energizing a third combination of variable speed compressors and increasing the speed of the third combination of energized compressors to provide the required compressor capacity.

In general, in another aspect, the invention features a refrigeration controller capable of controlling a plurality of variable speed compressors sharing a common discharge line and a common suction line, comprising a plurality of combinations of energized variable speed compressors, a compressor capacity threshold, a first combination of compressors having a greater energy efficiency ratio than the other combinations for compressor capacities greater than the compressor capacity threshold, and a second combination of compressors having a greater energy efficiency ratio than the other combinations for compressor capacities less than the compressor capacity threshold.

Advantages of the invention may include one or more of the following.

The invention may increase the efficiency of the refrigeration system employing variable speed compressors.

DESCRIPTION

A Variable Frequency Drive (hereinafter "VFD") controls an alternating current motor by accepting an input signal representing a desired change in motor speed and producing at its output a signal that varies in frequency depending on the input signal. The rotational speed of the AC motor increases as the VFD output frequency increases. If the VFD-controlled AC motor drives a compressor, the speed, and thus the refrigeration capacity, of the compressor can be controlled by varying the input signal to the VFD.

Figure 2:
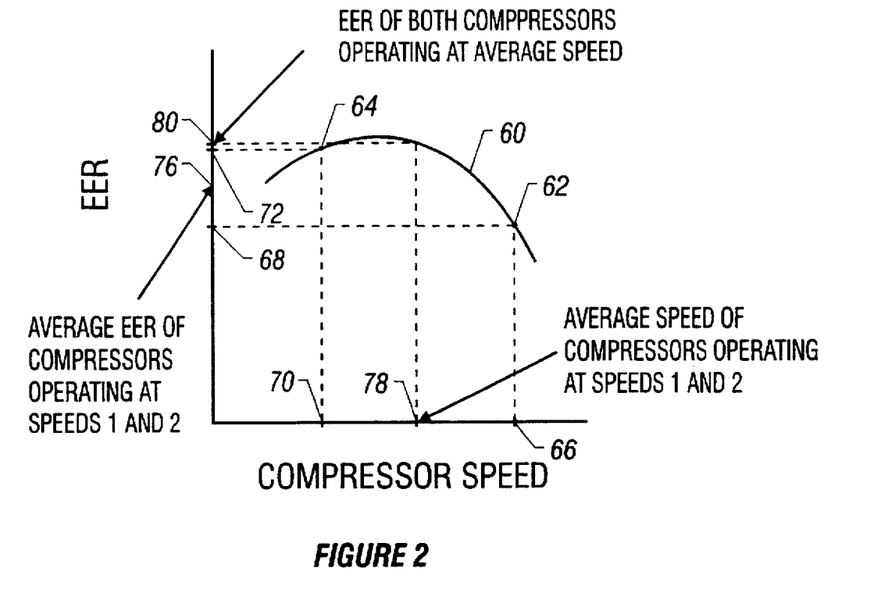
FIGS. 2, 3 and 4 are Energy Efficiency Ratio curves.

When the Energy Efficiency Ratio ("EER") of a VFD-controlled compressor is plotted as a function of compressor speed, a concave downward curve 60 is produced for some compressors, as shown in FIG. 2. As compressor speed increases, EER increases, reaches a peak, and then decreases.

If two equal capacity variable speed compressors having substantially identical EER curves (preferably within 10 percent) controlled by VFDs share common suction and discharge lines, as shown in FIG. 1, the relationship between EER and compressor speed for each compressor will be the curve shown in FIG. 2. If two of the compressors are operated as in existing refrigeration systems as described earlier, there will be a time when one of the compressors will be operating at near full speed, represented by point 62, and the other will be operating at a lower speed, represented by point 64. The compressor operating near full speed will be operating at a speed 66 with an EER 68. The compressor operating at the lower speed will be operating at a speed 70 with an EER 72. The average EER of the two compressors operating at the two different speeds 76 is the sum of the EERs of the two compressors divided by two.

These two variable speed compressors operating at a speed 78 which is the average of the speed 66 and the speed 70, provide the same compression capacity as when the two compressors operate at speeds 66 and 70. The average EER of both compressors operating at a speed equal to the average speed 80 is greater than the average EER when the two compressors are operating at two different speeds 76.

Figure 3:
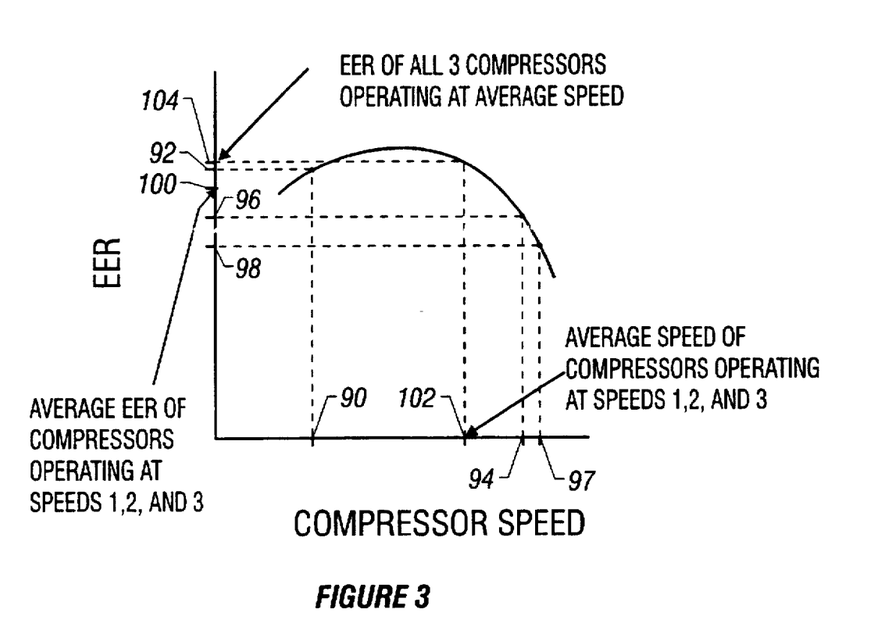

The same principle is true when there are three VFD-controlled compressors having substantially identical EER curves (preferably within 10 percent) sharing common suction and discharge lines, as shown in FIG. 3. A first compressor operating at a speed 90 will have an EER 92; a second compressor operating at a speed 94 will have an EER 96; and a third compressor operating at a speed 97 will have an EER 98. The average EER of the three compressors operating at three different speeds is an EER 100. If all three compressors are operated at a speed equal to the average of the three different speeds 102, they will have a higher EER 104 than the average EER of the three compressors operated at the three different speeds 100.

The same principle is true if the number of compressors in the system having substantially identical EER curves (preferably within 10 percent) is greater than three. In general, in a refrigeration system including more than one compressors having substantially identical EER curves (preferably within 10 percent), having downward concave EER/speed curves, and sharing common suction and discharge lines, the average EER of the compressors providing a given total amount of compression is greater if all the compressors operate at substantially the same speed (preferably within 10 percent) than if they operate at different speeds.

Figure 4:
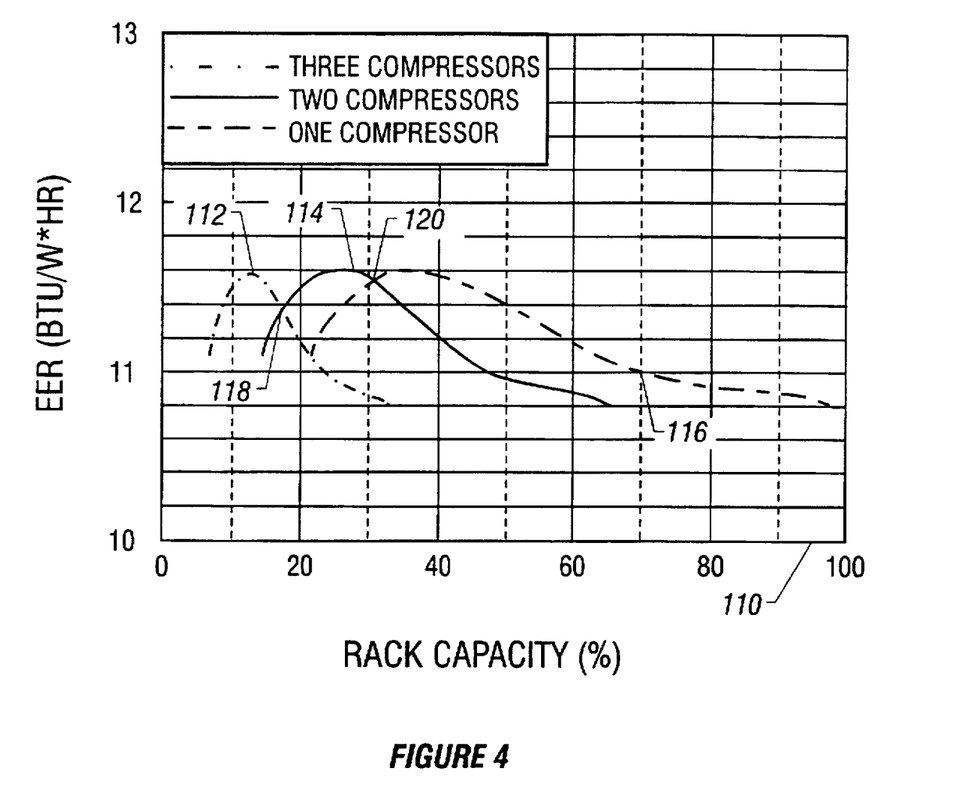

Combinations of compressors having substantially identical EER curves and sharing common discharge and suction lines produce a series of overlapping EER curves, as shown in FIG. 4 for a system having three equal compressors. The horizontal axis 110 represents "rack capacity (%)", which is determined by dividing the applied compressor capacity by the total capacity available. Thus, a single compressor in a three equal-capacity compressor system, can produce from a minimum value, related to the minimum speed of the compressor, to 33 percent of the rack capacity, represented by curve 112. Two compressors operating at the same speed, represented by curve 114, can provide between a minimum value and 66 percent of the rack capacity. The two compressor curve is the same as the one compressor curve except it has been "spread" over a larger percentage of rack capacity. Similarly, three compressors operating at the same speed, represented by curve 116, can provide between a minimum speed and 100 percent of the rack capacity. Again, the three compressor curve is a "spread" version of the one compressor curve.

An examination of the three curves just discussed reveals that there are ranges of rack capacity where each combination of compressors exhibits EER performance better than the other combinations of compressors. For example, up to a rack capacity 118, one compressor has better EER performance than two or three. For rack capacities between points 118 and 120, two compressors provide better EER performance than one or three. For rack capacities greater than point 120, three compressors provide better EER performance than one or two.

Figure 5:
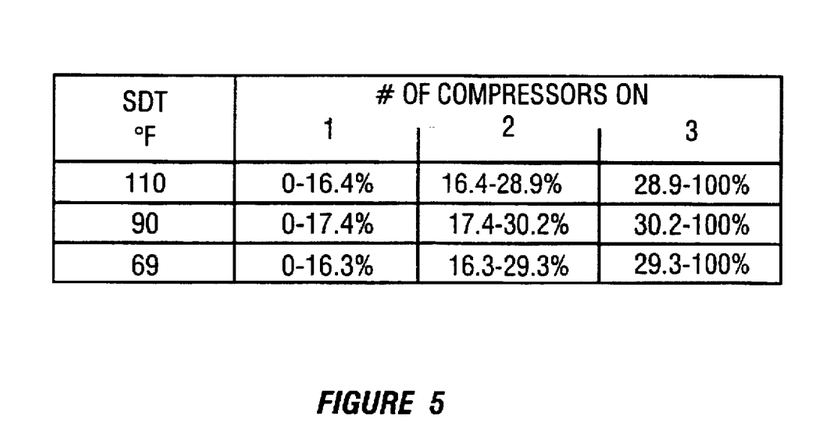
FIG. 5 is a table.

The crossover points change position depending on the saturated suction temperature ("SST") and the saturated discharge temperature ("SDT"), as is shown in FIG. 5. For one particular model of compressor, whose performance characteristics are represented by FIGS. 4 and 5, at an SST of 20° F., if SDT is 110° F., the crossover points occur at 16.4 percent and 28.9 percent; if SDT is 90° F., the crossover points occur at 17.4 percent and 30.2 percent; and if SDT is 69° F., the crossover points occur at 16.3 percent and 29.3 percent. The crossover points are also different from one model of compressor to another.

A similar set of curves can be created for systems with more than three variable speed compressors, with a set of unequal capacity variable speed compressors, or a set of variable speed compressors combined with a set of fixed capacity compressors.

Figure 6:
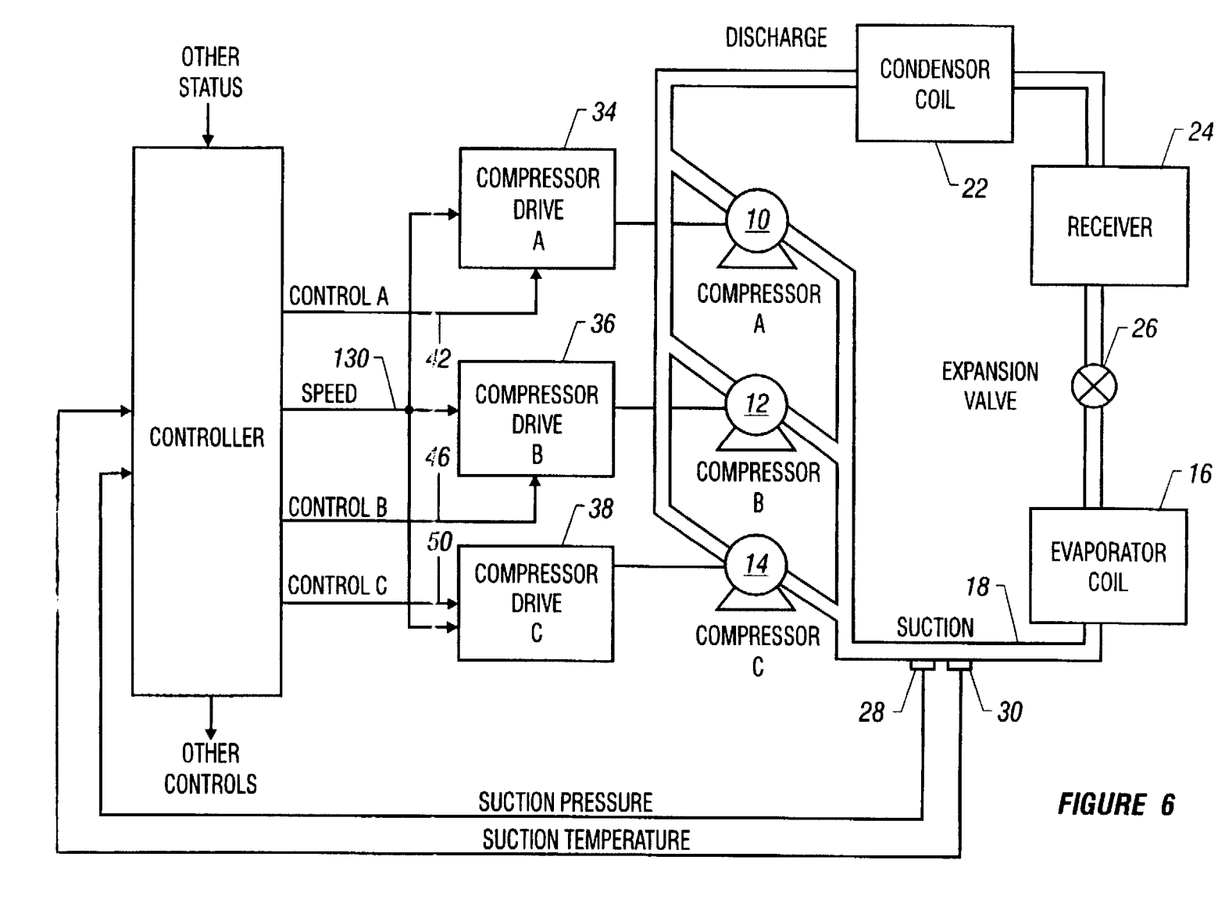

A refrigeration system that drives all of its compressors at the same speed can be accomplished as shown in FIG. 1, with the controller controlling the speed A, speed B and speed C signals so that all the compressors are driven at the same speed. Alternatively, the speed inputs to the compressor drives may be tied together as is shown in FIG. 6. In this approach, the controller need only produce a single speed output 130 which controls the speed of all the compressors.

Figure 7A:
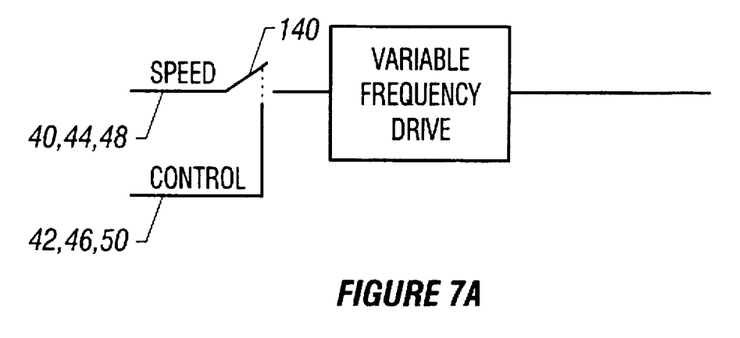
FIGS. 7A, 7B, and 7C are block diagrams of components of a refrigeration system.
Figure 7B:
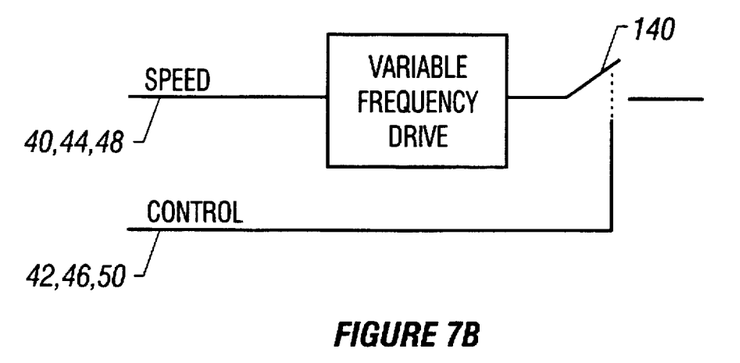
Figure 7C:
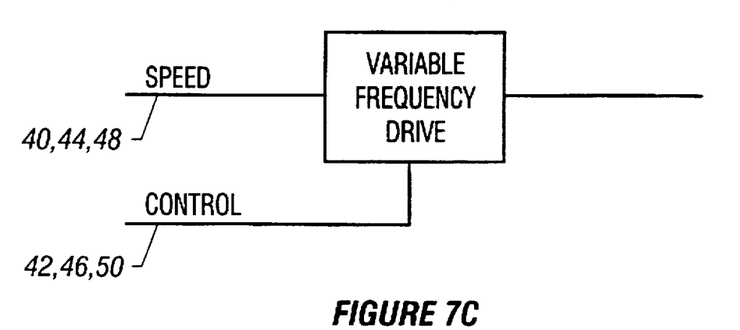

Compressor drives A, B and C may take a variety of forms, as illustrated in FIGS. 7A, 7B and 7C. In one form, shown in FIG. 7A, the control input 42, 46, 50 controls a switch 140, which connects the speed input 40, 44, 48 to the VFD when it is closed. When the switch opens, the VFD has no input and the VFD output drops to zero, stopping the compressor to which it is connected. In another arrangement, shown in FIG. 7B, the switch is moved to the output of the VFD, so that when it is open the drive to the compressor is removed causing it to stop. In a third arrangement, shown in FIG. 7C, the control input turns the VFD on and off.

The VFD may take a variety of forms as well. For example, the VFD input may be such that a particular input voltage will produce a corresponding output frequency. Alternatively, the VFD input may take the form of an error signal so that the rate of change of the VFD output frequency is proportional to the VFD speed input signal.

Figure 8:
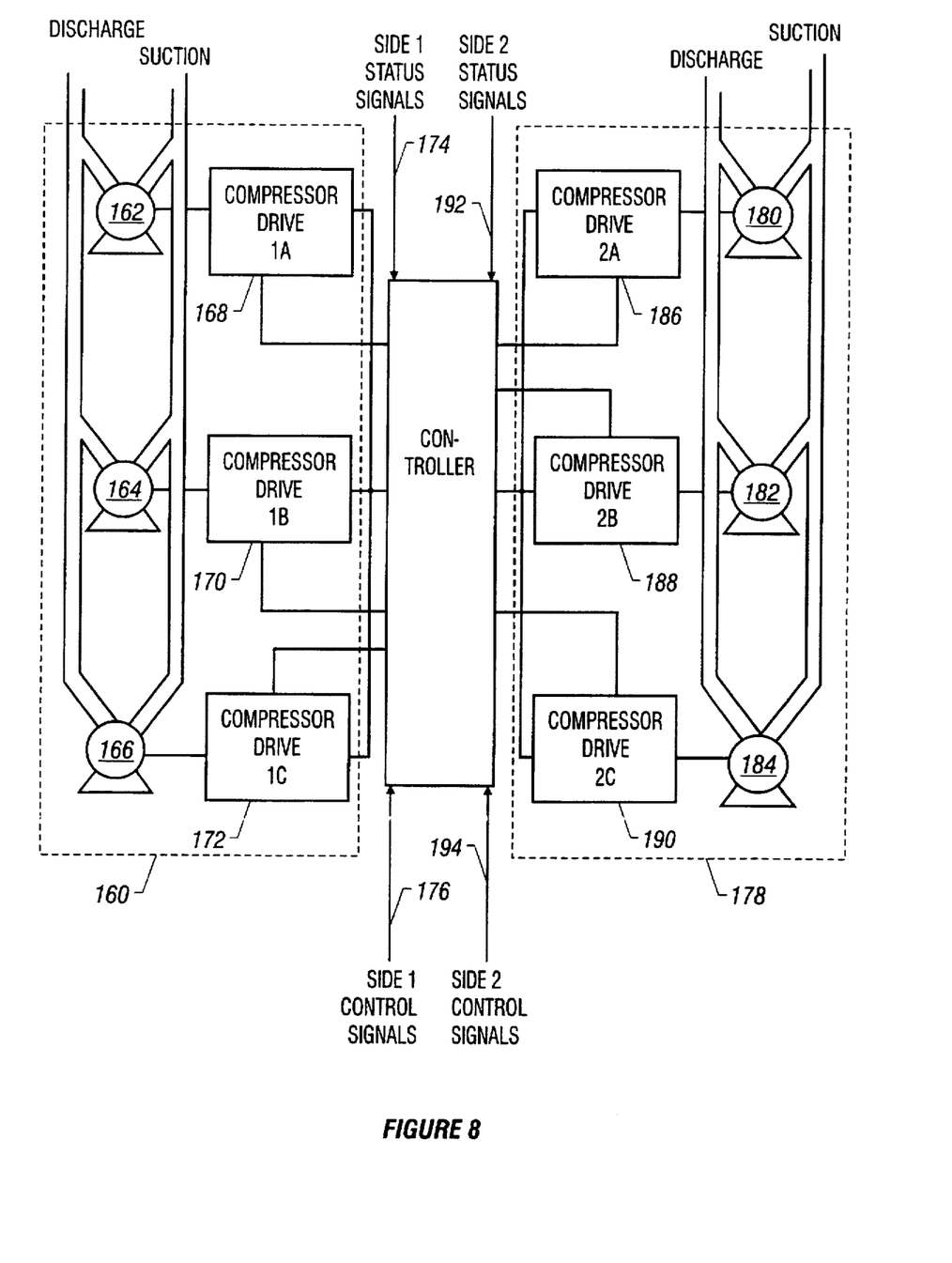

Furthermore, a single controller may control more than one set of compressors, as shown in FIG. 8. The first set, called "side 1" 160, consists of compressors 162, 164, 166, compressor drives 168, 170, 172, condenser coil, receiver, expansion valve, evaporator coil and sensors (not shown), status signals 174 and control signals 176. "Side 2" 178, consists of compressors 180, 182, 184, compressor drives 186, 188, 190, condenser coil, receiver, expansion valve, evaporator coil and sensors (not shown), status signals 192 and control signals 194. The two sides may be arranged in stages so that each stage provides increasing compression of the same refrigerant. A controller can also control three or more sides.

As will be seen in more detail below, the invention compares required rack capacity against set points such as those shown in FIG. 4 to determine what combinations of compressors should be energized to meet the system load. The set points are stored in set point tables similar to that illustrated in FIG. 5.

The tables are prepared by testing the compressors to be included in the refrigeration system to determine their EER over their operating range. This testing is performed by using each compressor to drive a test refrigeration system which cools a vessel through which a fluid is allowed to flow. The energy consumed by the compressor, the temperature of the fluid flowing into and out of the vessel, and the flow rate of the fluid through the vessel are measured. This information is used to determine the compressor's EER. EER is measured for a variety of compressor speeds across the compressor's operating region. The EER versus compressor speed curve is then plotted. The curve for one compressor is plotted into the region defined by the percentage of the capacity supplied by that one compressor. The curve for two compressors is plotted into the region of total system capacity provided by those two compressors by spreading the EER curve as described above, and so on for the remaining combinations of compressors. With the compressor curves plotted, it is possible to determine the crossover points which are then stored in a table in the controller. Similar tables are developed for different values of SST and for different values of SDT and are also stored in the controller.

If the compressors in a refrigeration system are not all the same, the EER curves of the different compressor combinations must be averaged before they can be spread into the region of total system capacity the combination can provide. For example, if a refrigeration system includes two 10 horsepower and one 5 horsepower compressor and the 5 horsepower compressor is the last to be energized, the third curve, which will extend to 100 percent capacity, will be an average of two 10 horsepower EER curves with one 5 horsepower EER curve.

If the order that the compressors are to be energized is intended to be varied, sets of curves and set points must be developed for every possible order that the compressors may be energized. Generally, the compressor with the highest EER is the first compressor to be activated, whether it is variable speed or constant speed.

A computer algorithm for controlling a compressor system such as that described in FIG. 6 is shown in FIGS. 9A-9F. At an overview level, shown in FIG. 9A, the system operates in a recurring loop. First, the controller reads input signals, including suction pressure, 200. It then calculates, using procedures described in detail below, which compressors should be on and the speed at which they should driven, 202. The controller then energizes the selected compressors, deenergizes the compressors not selected, and sets the speed of the energized compressors to the calculated speed, 204, which maximizes the EER at that moment. The loop then repeats.

Figure 9A:
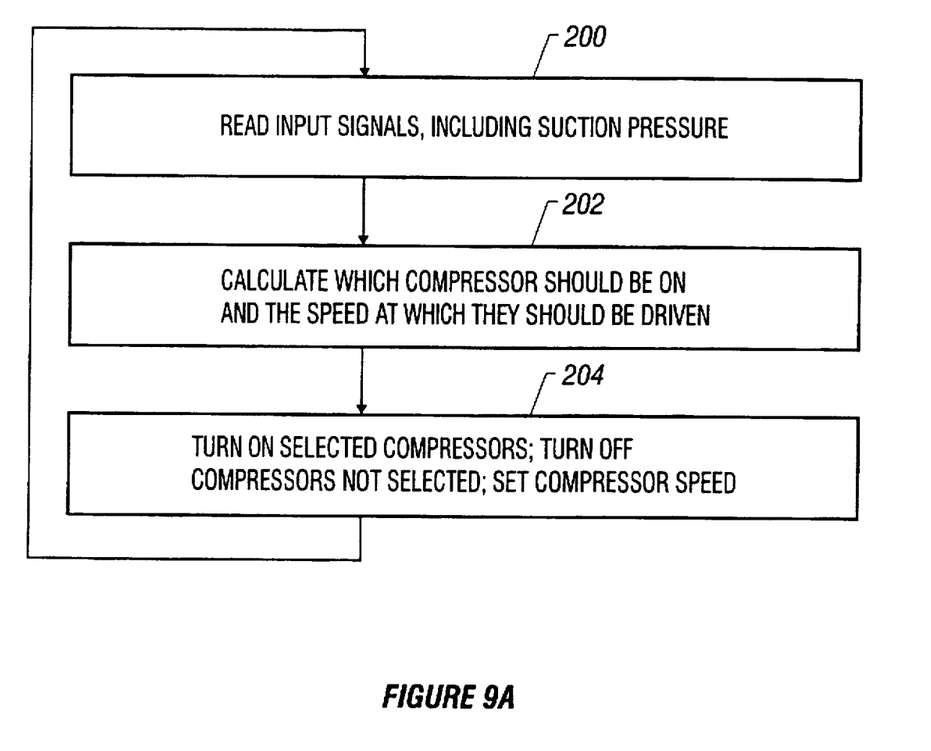
FIGS. 9A through 9F are flow charts.
Figure 9B:
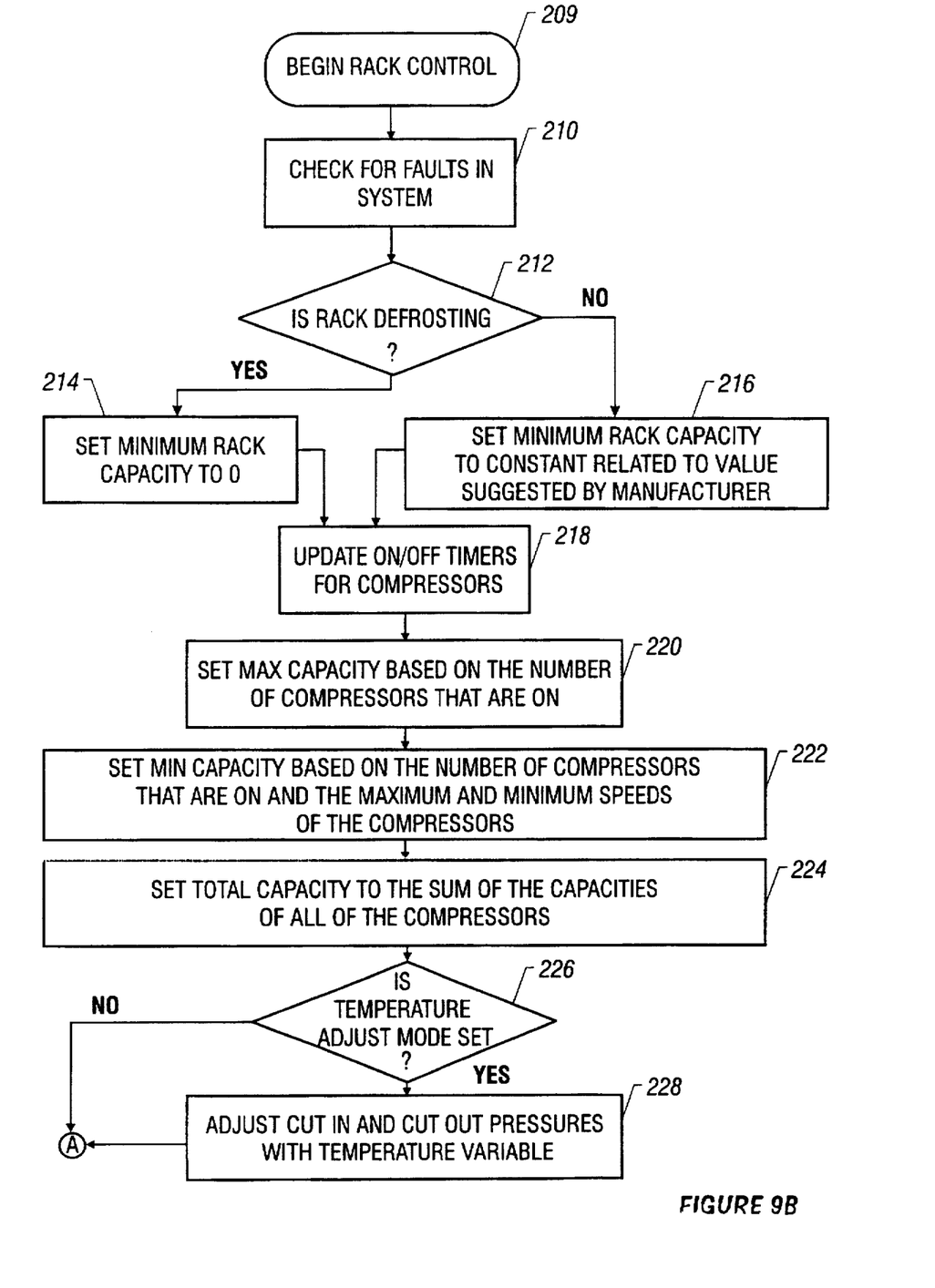

The calculations of which compressors should be on and the speed at which those compressors should be driven (known as "rack control" 209) begins with the controller checking for faults in the system, 210, as shown in FIG. 9B.

The controller checks for such faults as low suction pressure, high head pressure, case temperature, liquid levels in the various vessels, etc. The controller then determines if the rack is defrosting, 212. If the rack is defrosting the compressor should not be allowed to turn on and therefore minimum rack capacity is set to zero, 214. Otherwise, the minimum rack capacity is set to a constant which is related to a value suggested by the compressor manufacturer, 216.

The controller then updates on/off timers for the compressors, 218. Each compressor has associated with it a pair of timers, only one of which is active at any given time. One timer times the length of time that a compressor has been energized since the last time it was deenergized and the other times the amount of time that the compressor has been deenergized since the last time it was energized. The controller checks these timers before energizing or deenergizing a compressor to prevent the compressor from turning rapidly on and off.

The controller next sets max capacity to a value related to the number of compressors that are energized 220. Min capacity is then set to a value related to the number of compressors that are energized and the maximum and minimum speeds of the compressors. Total capacity is set to the sum of the capacities of all of the compressors 224.

If the system is in the temperature adjust mode, the cut in and cut out pressures are adjusted based on the temperature variable, which is based on the temperature of the refrigerated area, 226, 228. Otherwise, if control gain and differential gain are both greater than zero, 230, suction pressure is checked to see if it is rising or falling faster than a threshold value, 232. If it is, one flag is set if suction pressure is rising too quickly and another flag is set if it is falling too quickly, 234.

Figure 9C:
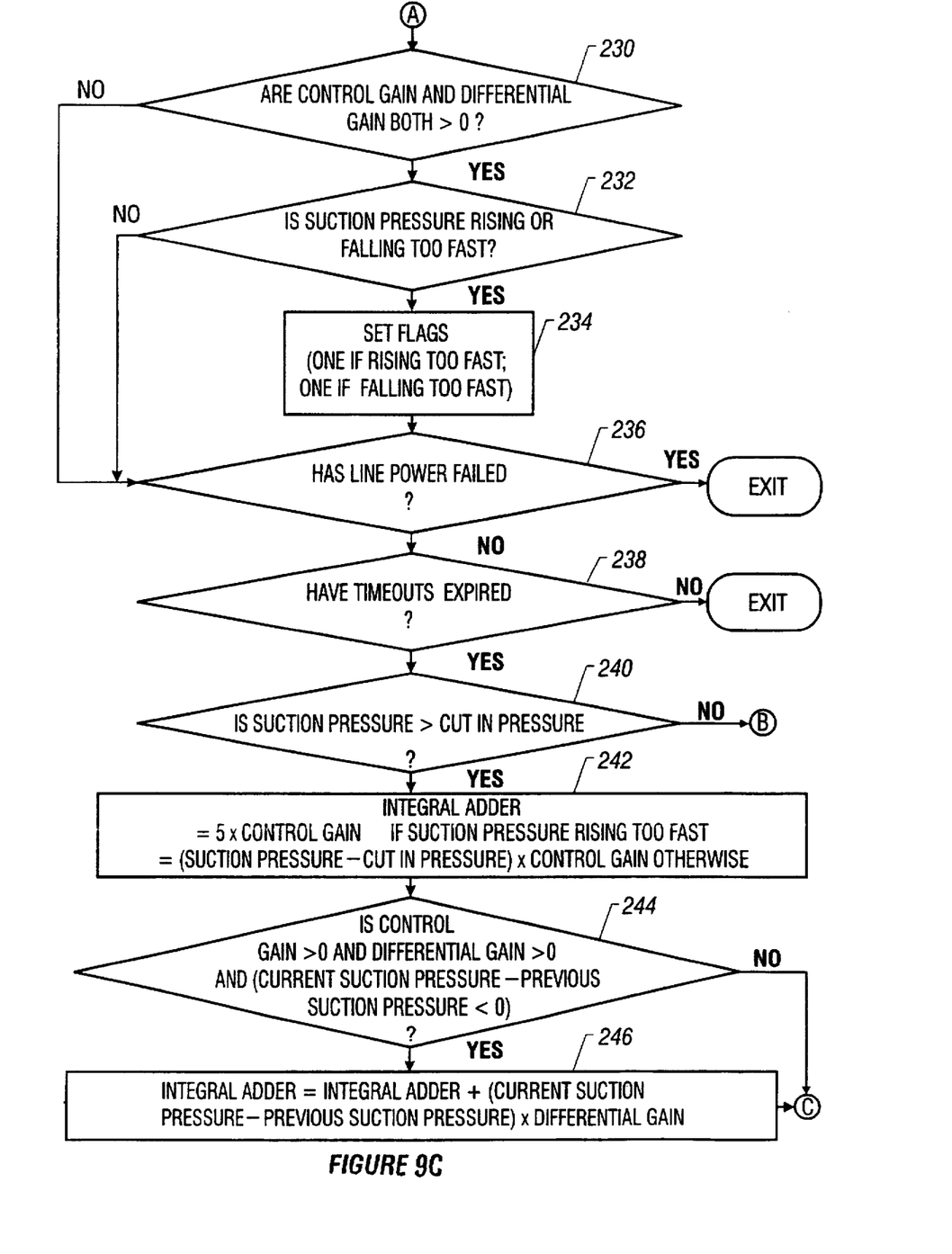

If line power has failed, the algorithm exits and returns to the loop shown in FIG. 9C, 236. If time outs, such as power-up time outs or reset time outs, have not yet expired, the system exits and returns to the loop shown in FIG. 9C, 238.

In the next few steps, the controller updates an integrator which integrates the fluctuations in suction pressure over time. As will be shown below, the integral is used to determine which compressors should be energized and the speed at which they should be running. The controller first determines if suction pressure is greater than cut in pressure 240. If it has, an integral adder is set to one of two values depending on whether the suction pressure is rising too fast 242:

$$\begin{aligned}\text{Integral Adder} &= 5 \times \text{Control Gain,} \\ &\qquad \text{if suction pressure rising too fast} \\ &= (\text{suction pressure} - \text{cutin pressure}) \times \text{control gain,} \\ &\qquad \text{otherwise}\end{aligned}$$

If a control gain is greater than zero, a differential gain is greater than zero, and the current suction pressure minus the previous suction pressure is less than zero, indicating that the suction pressure is dropping, 244, the integral adder is increased according to the following equation, 246:

$$\text{Integral Adder=Integral Adder+(current suction pressure-previous suction pressure)} \times \text{differential gain}$$

If the suction pressure is less than the cut in pressure, it is compared to the cut out pressure. If the suction pressure is less than the cut out pressure, 248, the integral adder is set to one of two values depending on whether the suction pressure is falling too fast, 250:

$$\begin{aligned}\text{Integral Adder} &= -5 \times \text{Control Gain,} \\ &\qquad \text{if suction pressure falling too fast} \\ &= (\text{suction pressure} - \text{cutout pressure}) \times \text{control gain,} \\ &\qquad \text{otherwise}\end{aligned}$$

If the control gain is greater than zero and the differential gain is greater than zero, 252, the integral adder is increased according to the following equation, 254:

$$\text{Integral Adder=Integral Adder+(current suction pressure-previous suction pressure)} \times \text{differential gain}$$

If the suction pressure is between the cut in pressure and the cut out pressure, 248, the integral adder is set as follows, 256:

$$\text{Integral Adder=+(current suction pressure-previous suction pressure)} \times \text{differential gain}$$

Once the computations of the integral adder are completed, the integral is computed according to the following equation, 258:

$$\text{Integral=Integral+Integral Adder}$$

If the integral is greater than the max integral, 260, the integral is set to the value of max integral, 262. If the integral is less than zero, 264, integral is set to zero, 266.

Figure 9D:
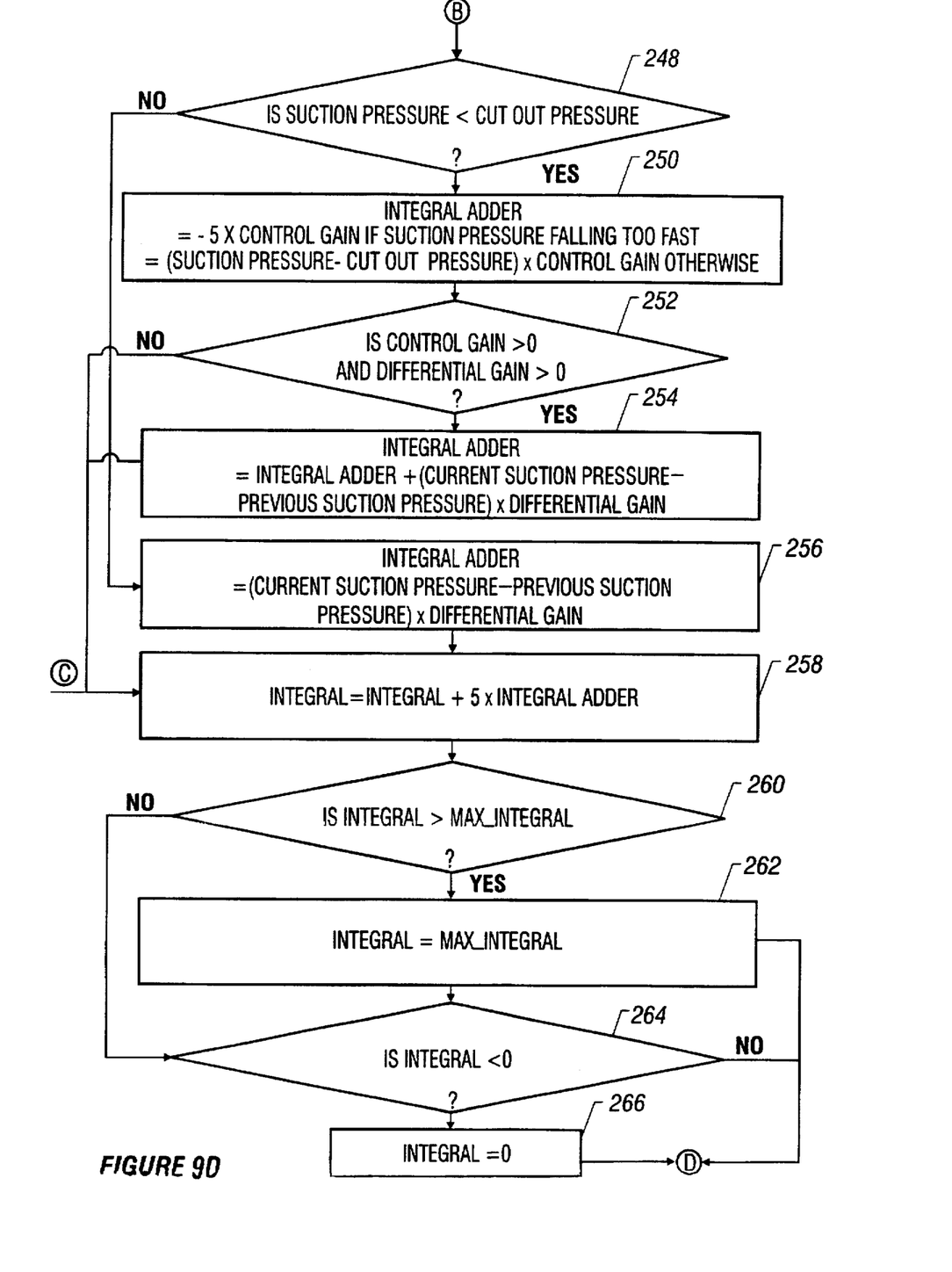

The controller next computes the capacity necessary to meet the load placed on the system. Required capacity is set, 268, to $$\text{Required Capacity} = \frac{\left(\text{Integral} \times \text{Total Capacity} + \frac{\text{Max Integral}}{2}\right)}{\text{Max Integral}}$$

If the required capacity is less than the minimum capacity, 270, the required capacity is set to the minimum capacity, 272. The required percent capacity is then calculated, 274.

$$\text{Required Percent Capacity} = \frac{\text{Required Capacity} \times 100}{\text{Total Capacity}}$$

The required percent capacity is used to access the set point table to determine the combination of compressors that is most efficient for the required percent capacity, 276.

Figure 9E:
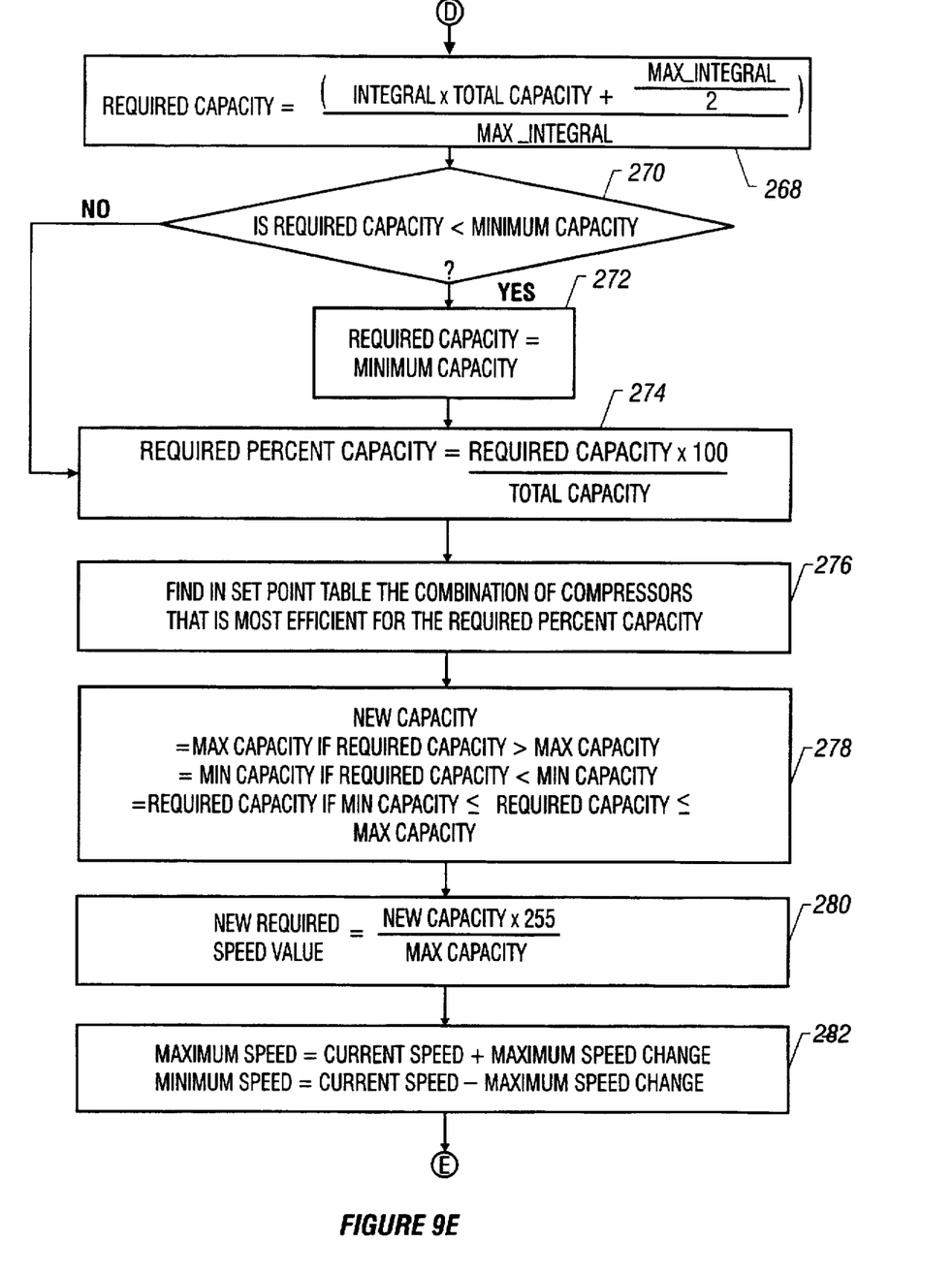

The next series of steps computes the speed of the compressors necessary to match the needs of the system. A variable called new capacity is set to max capacity if required capacity is greater than max capacity, min capacity if required capacity is less than min capacity, and required capacity if min capacity is less than or equal to required capacity and required capacity is less than or equal to max capacity, 278. A new required speed value is set, 280, to,:

$$\text{New Required Speed Value} = \frac{\text{New Capacity} \times 255}{\text{Max Capacity}}$$

Figure 9F:
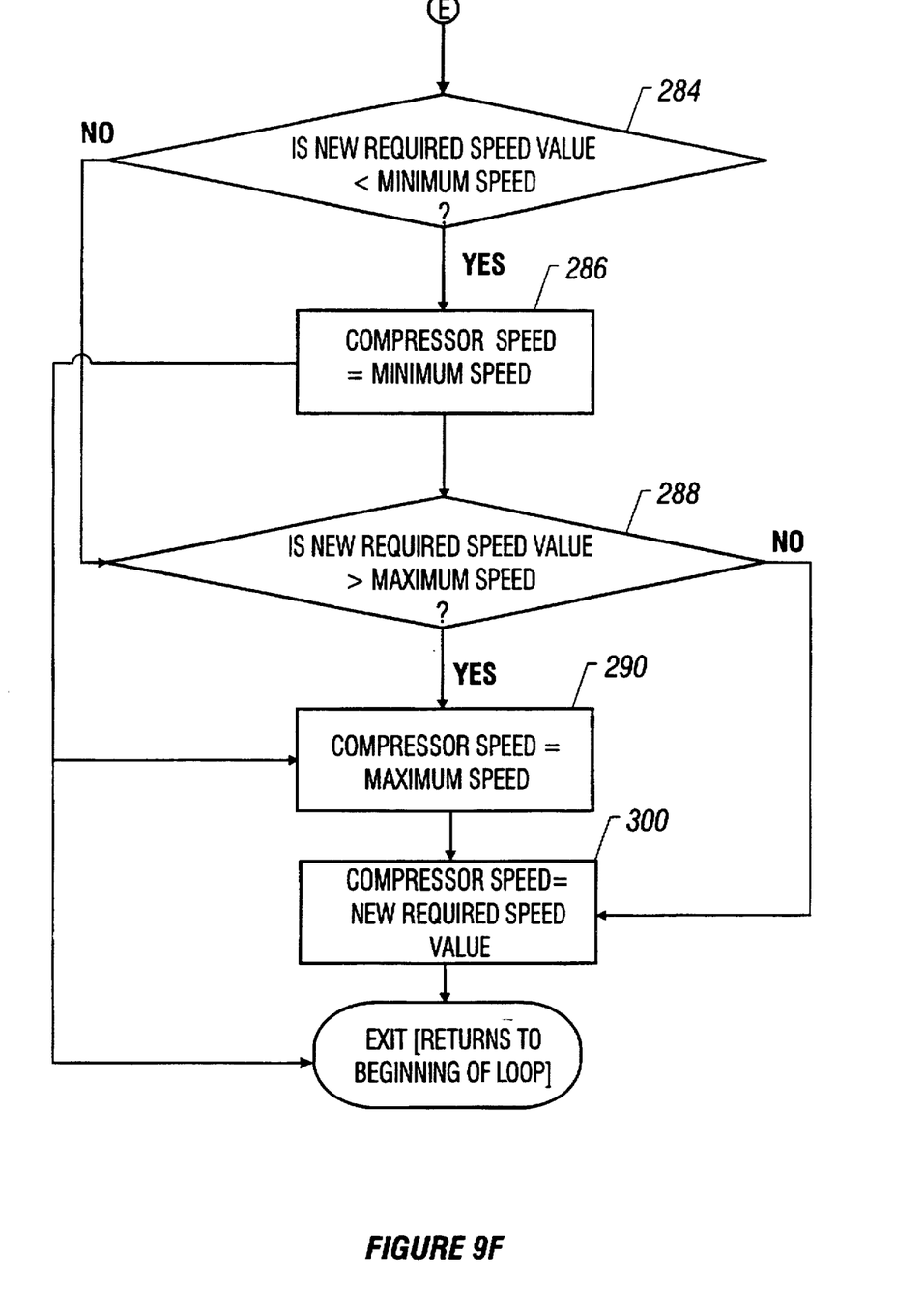

A maximum speed and a minimum speed are computed as follows, 282:

Maximum Speed = current speed + maximum speed change
Minimum Speed = current speed − maximum speed change If the new required speed value is less than the minimum speed, 284, the compressor speed is set to the minimum speed 286 and the computation is complete. If the new required speed value is greater than the maximum speed 288 the compressor speed is set to the maximum speed 290 and the computation is complete. If the new required speed value is between the minimum speed and the maximum speed, the compressor speed is set to the new required speed value, 300, and the computation is complete.

Other embodiments are within the scope of the following claims.

What is claimed is:

1. A refrigeration system comprising a plurality of variable speed compressors and a controller, the controller being configured to energize a subset of the variable speed compressors, the subset being determined by comparing a capacity requirement of the refrigeration system against a stored set point table stored in the controller, the stored set point table defining a plurality of ranges of required rack capacity over which defined subsets of the plurality of variable speed compressors provide a greater energy efficiency ratio than any other subsets when each energized variable speed compressor operates at a speed substantially the same as the other energized variable speed compressors, the speed being below a maximum speed of the compressors.

2. The refrigeration system of claim 1 wherein the plurality of variable speed compressors share a common discharge line and a common suction line.

3. The refrigeration system of claim 1 further comprising a plurality of fixed capacity compressors sharing the common discharge line and the common suction line.

4. A method for controlling combinations of a plurality of variable speed compressors sharing a common discharge line and a common suction line, comprising
calculating a required rack capacity to satisfy a refrigeration load,
energizing a subset of the variable speed compressors, the subset determined by comparing the required rack capacity to a stored set point table, and
the stored set point table defining a plurality of ranges of required rack capacity over which defined subsets of the plurality of variable speed compressors provide a greater energy efficiency ratio than any other subsets when the energized variable speed compressors operate at substantially a same speed.

5. The method of claim 4 further comprising
determining the speed at which the chosen combination of compressors provides the required compressor capacity.

6. In a refrigeration system comprising a plurality of variable speed compressors sharing a common discharge line and a common suction line, each compressor operating at a speed substantially the same as the other energized compressors, a first combination of compressors capable of providing a first range of percentage of a maximum capacity provided by the plurality of compressors, and a second combination of compressors capable of providing a second range of percentage of the maximum capacity provided by the plurality of compressors, a method for determining a range of compressor speeds at which the first combination of compressors is more energy efficient than the second combination of compressors, comprising
measuring a first energy efficiency ratio of the first combination of compressors over the first range of percentage of the maximum capacity,
measuring a second energy efficiency ratio of the second combination of compressors over the second range of percentage of the maximum capacity,
calculating a third range of percentages of the maximum capacity over which the first energy efficiency ratio is greater than the second energy efficiency ratio and a fourth range of percentages of the maximum capacity over which the second energy efficiency ratio is greater than the first energy efficiency ratio, and
storing the third range and the fourth range in a set point table in a memory in a controller.

7. In a refrigeration system comprising a plurality of variable speed compressors, each variable speed compressor having a maximum capacity, a method for controlling the compressors, comprising
determining a total capacity equal to the sum of the maximum capacities of the energized variable speed compressors, determining a required capacity required to meet a refrigeration load,
calculating a required compressor speed equal to a scaled ratio of the required capacity to the total capacity,
comparing the required compressor speed to a stored set point table to determine a subset of the plurality of variable speed compressors that provides a greater energy efficiency ratio than any other subset of the plurality of variable speed compressors at the required compressor speed, and
energizing the subset of the plurality of compressors to operate at a speed substantially identical to the required speed.

8. A refrigeration system controller configured to energize a subset of a plurality of commonly piped variable speed compressors, the controller further configured to determine the subset of compressors by comparing a required rack capacity against a stored set point table defining a plurality of ranges of required rack capacity over which different subsets of the plurality of variable speed compressors provide a greater energy efficiency ratio than any other subsets when each compressor operates at a speed substantially the same as the other energized variable speed compressors.

9. A refrigeration system controller configured to control a plurality of variable speed compressors by calculating a required rack capacity, the controller further configured to choose a subset of compressors to energize by comparing the required rack capacity to a stored set point table defining a plurality of ranges of required rack capacity over which defined subsets of the plurality of variable speed compressors provide a greater energy efficiency ratio than any other subsets when each compressor operates at a speed substantially the same as the other energized variable speed compressors.

10. A refrigeration system controller configured to calculate a required rack capacity, the controller being further configured to determine a subset of compressors to energize by comparing the required rack capacity against a stored set point table defining a plurality of ranges of required rack capacity over which defined subsets of the plurality of variable speed compressors provide a greater energy efficiency ratio than any other subsets when each compressor operates at a speed substantially the same as the other energized variable speed compressors, the controller further comprising
a single speed control output signal for controlling the speed of the determined subset of variable speed compressors.

11. The refrigeration system controller of claim 10 further comprising a plurality of energize signals, each energize signal configured to cause one of the plurality of variable speed compressors to activate.

12. A method for controlling a plurality of variable speed compressors sharing a common discharge line and a common suction line, a first combination of the plurality of variable speed compressors operating at a same speed, comprising determining a required compressor capacity, if the required compressor capacity is above an upper threshold stored in a set point table containing a plurality of ranges of required rack capacity over which defined subsets of the plurality of variable speed compressors Provide a greater energy efficiency ratio than any other subsets, energizing a second combination of the plurality of variable speed compressors having a greater energy efficiency ratio than the first combination at the required compressor capacity and changing the speed of the second combination of energized compressors to provide the required compressor capacity, and if the required compressor capacity is below a lower threshold stored in the set point table, energizing a third combination of variable speed compressors and changing the speed of the third combination of energized compressors to provide the required compressor capacity.

13. A refrigeration controller capable of controlling a plurality of variable speed compressors sharing a common discharge line and a common suction line, comprising a plurality of combinations of energized variable speed compressors, a compressor capacity threshold stored in a set point table containing a plurality of ranges of required rack capacity over which defined subsets of the plurality of variable speed compressors provide a greater energy efficiency ratio than any other subsets, a first combination of compressors having a greater energy efficiency ratio than the other combinations for compressor capacities greater than the compressor capacity threshold, and a second combination of compressors having a greater energy efficiency ratio than the other combinations for compressor capacities less than the compressor capacity threshold.

* * * * *